United States Patent [19]

Godard et al.

[11] Patent Number: 4,604,713
[45] Date of Patent: Aug. 5, 1986

[54] TONE DETECTOR AND MULTIFREQUENCY RECEIVER USING SAID DETECTOR

[75] Inventors: Dominique Godard, Le Rouret; Emile Morlec, Saint-Paul, both of France

[73] Assignee: International Business Machines Corp., Armonk, N.Y.

[21] Appl. No.: 503,965

[22] Filed: Jun. 13, 1983

[30] Foreign Application Priority Data

Jun. 25, 1982 [EP] European Pat. Off. ........ 82430017.2

[51] Int. Cl.[4] ........................ G06F 15/31; H04Q 1/45; H04M 1/50
[52] U.S. Cl. ............................... 364/484; 179/84 VF; 364/487
[58] Field of Search ............... 364/484, 485, 486, 487; 179/84 VF

[56] References Cited

U.S. PATENT DOCUMENTS

| | | | |
|---|---|---|---|
| 4,100,378 | 7/1978 | Claasen et al. | 364/484 X |
| 4,231,094 | 10/1980 | Desblache | 364/487 X |
| 4,258,423 | 3/1981 | Lane et al. | 364/484 |
| 4,297,533 | 10/1981 | Gander et al. | 179/84 VF |
| 4,354,248 | 10/1982 | Conger et al. | 179/84 VF X |
| 4,363,100 | 12/1982 | Agnew et al. | 364/484 |
| 4,484,035 | 11/1984 | Graham et al. | 364/484 X |

Primary Examiner—Felix D. Gruber
Attorney, Agent, or Firm—John B. Frisone

[57] ABSTRACT

The purpose of the receiver is to indicate the reception of a multifrequency signal and to identify said signal. A multifrequency signal is a signal combining two predetermined pure tones, one belonging to a high-frequency range, the other to a low-frequency range. The received signal is sampled at 8 KHz and digitally converted. The signal provided by the converter is simultaneously processed by two tone detectors. Each tone detector comprises: a bandpass filter covering the high- or low-frequency range and supplying the components (x, y) of the filtered signal in Cartesian coordinates; decimation means at the output of said filters; a converter converting the Cartesian coordinates (x, y) into polar coordinates ($\rho$, $\theta$); and logic circuits analyzing the variations of said $\rho$ and $\theta$ over fixed periods of time to derive therefrom an identification of the received tone.

4 Claims, 4 Drawing Figures

TONE DETECTOR AND MULTIFREQUENCY RECEIVER USING SAID DETECTOR

TECHNICAL FIELD

The present invention relates to a tone detector and more particularly to a tone detector for multifrequency receivers.

TECHNICAL BACKGROUND

The signals that are to be detected are composed of at least one frequency chosen from a finite set of frequencies.

More particularly this invention will deal with multifrequency signals that are usually composed of a combination of two pure frequency signals. These signals can, for example, be the dialing signals of a telephone keyboard. In this case, depressing any one of the keys of the keyboard causes a multifrequency signal, corresponding to the combination of two frequencies chosen in a set of eight predetermined frequencies, to be transmitted to the central office (PBX or CX). The identification of the depressed key, and hence recognition of the requested telephone number, is performed in the central office by a so-called multifrequency receiver (MFR) whose task is to detect the presence of the multifrequency signal in the received wave and to identify the two frequencies forming the multifrequency signal received.

In general, one of the two frequencies coupled to form a multifrequency signal belongs to a so-called low-frequency band (about 700 to 1000 Hz for example), the other one belongs to a so-called high-frequency band (about 1200 to 1700 Hz for example). Thus, the simplest MFR receiver could consist of two filters only, i.e. a low-pass filter (LPF) and a high-pass filter (HPF), both cutting off between 1000 and 1200 Hz. Each of the bands thus obtained would in turn be split into four subbands, each one being defined so as to include only one of the eight predetermined frequencies mentioned above. The MFR problem is thus reduced to detecting two pure frequency signals (tone), one being in the low band (the LPF filter band), the other being in the high band (the HPF filter band). The MFR receiver is thus composed of two similar tone receivers, one for detecting and identifying a high frequency, the other one a low frequency. One might thus assume that the MFR function may be then completed by measuring the energy in each of said subbands and by deriving therefrom an identification of the subbands carrying the highest energy within each of the two frequency bands, i.e. high and low.

However, proceeding in this manner without taking additional precautions would provide a circuit that is particulary sensitive to erroneous detections. It would not be capable of distinguishing a real numbering signal from any ambiant noise, e.g. a speech signal.

An improvement to the above MFR has been proposed which includes a limiter circuit at the output of the LPF and HPF filters. Such a system has been described in the Bell System Technical Journal (BST) of September 1981, volume 60, No 7, pages 1574-1576. The limiter circuit plays a double part: first, it acts as an amplitude limiter to normalize the amplitude of the output signals of the LPF and HPF filters and second, it tends to favor the subband signals containing a pure frequency (case of the signals to be detected by the MFR) over those containing several frequencies (noise).

It should be further noted that in practice all operations of the MFR receiver are performed in digital mode. This means that before the signal is presented to the LPF and HPF filters, it is sampled at the Nyquist frequency of about 8 KHz and digitally coded with 12 or 16 bits. All filtering operations executed by the MFR are thus performed in digital mode by means of microprocessors. The use of microprocessors causes a computing noise which can disturb the operation of the MFR receiver. Furthermore, the computing power required for processing 8000 digital samples per second is rather significant and this imparts the MFR cost.

SUMMARY

An object of the present invention is therefore to implement a pure tone receiver at relatively low cost and a multifrequency receiver using said tone receiver and providing sufficient protection against erroneous detections of multifrequency signals.

Another object of the invention is to provide a pure tone receiver including:
- a bandpass filter with a bandwidth including the tone frequency or frequencies to be detected, said filter filtering the received signal and supplying the in-phase and quadrature components of the filtered signal;
- means for combining said components of the filtered signal to derive therefrom the phase and amplitude data of the filtered signal; and,
- means for analyzing said phase and amplitude data and for indicating the tone signal reception when said amplitude data remain essentially constant during a predetermined time interval, whereas the phase variations remain substantially constant over equal time intervals.

A further object of the invention is to provide a multifrequency receiver (MFR) including:
- a first tone receiver as defined above, with a bandwidth covering a so-called high-frequency range;
- a second tone receiver similar to the first tone receiver and having a bandwidth covering a so-called low-frequency range; and,
- means for identifying the MFR signal received by analyzing said phase variations and deriving therefrom the value of the frequency of the signal received by each of said receivers.

DESCRIPTION OF PREFERRED EMBODIMENT

The multifrequency signals used in telephony for the numbering functions and to be considered hereafter, are composed of two pure frequency signals. One of these signals belongs to a so-called low-frequency group and can have one of the four following values: 697, 770, 852 and 941 Hz. The other signal belongs to a so-called high-frequency group and can have one of the following values: 1209, 1336, 1477 and 1633. There are 16 combinations, hence 16 possible multifrequency signals, which the MFR receiver must be able to detect and identify in the presence of noise, e.g. dialing tones ranging between 15 and 480 Hz. Another important characteristic of the MFR is that speech signals or music must not be detected as valid MF signals. In other words any erroneous dialing detection must be avoided.

Figure 1:
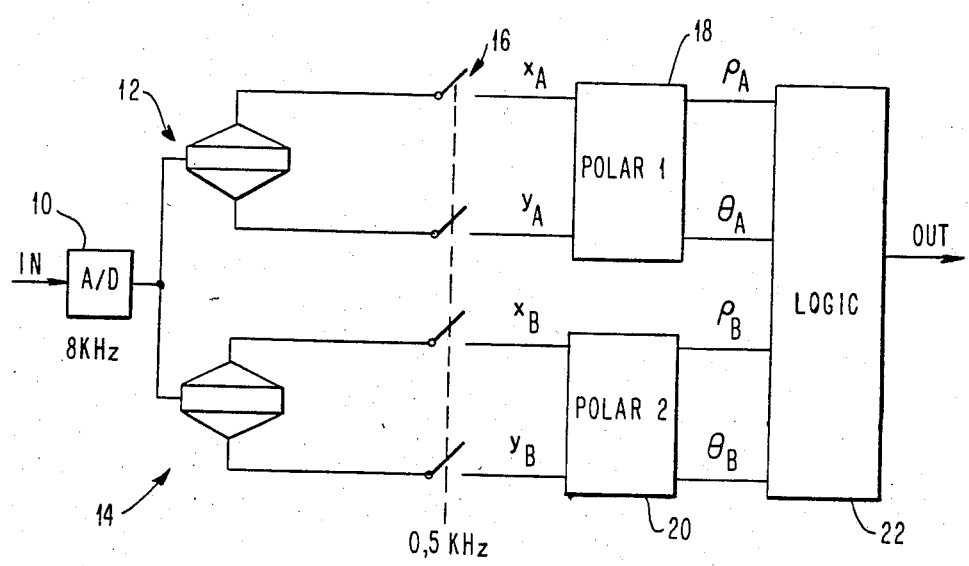
FIG. 1 illustrates the basic circuit diagram of a multifrequency receiver according to the invention.

FIG. 1 shows the basic circuit diagram of the multifrequency receiver of the invention. The input signal is sampled at 8 KHz and converted to digital by the analog-to-digital converter 10. The output of converter 10 is simultaneously fed into two filter circuits 12 and 14 of the Hilbert transformer type. Filter 12 is a bandpass filter having a bandwidth covering the low frequency group 697 to 941 Hz. The other filter (14) is a bandpass filter the bandwidth of which convers the high-frequency group 1209 to 1633 Hz. Each of the filters 12 and 14 supplies a signal in Cartesian coordinates, i.e. defined by two components, one in phase component ($x_A(t)$ or ($x_B(t)$), and one quadrature component ($y_A(t)$ or $y_B(t)$). Each couple (x, y) defines a so-called analytical signal S such as:

$$S_A(t) = x_A(t) + jy_A(t) \quad (1)$$

$$S_B(t) = x_B(t) + jy_B(t) \quad (2)$$

Owing to the characteristics of the analytical signals, the output signal of each filter 12 or 14 can be sampled at a frequency equal to or higher than its bandwidth instead of being sampled at twice its higher frequency, and this without any noise caused by sampling. In the present case, the sampling frequency of each filter 12 or 14 output can thus be lowered to 500 Hz by a so-called decimation operation. This is illustrated in FIG. 1 by switches activated at a rate of 0.5 KHz. The computing power required for subsequently processing the decimated signals is thus considerably lower than that required had the sampling frequency of the signal remained at 8 KHz. Each of the signals $S_A(t)$ and $S_B(t)$ is processed by a polar coordinates converter 18, 20 converting the Cartesian coordinates (x, y) into polar coordinates ($\rho$, $\theta$) where $\rho$ is the amplitude of the processed signal and $\theta$ is its phase. The phase and amplitude signals information of the low-frequency band (i.e. $\rho_A$, $\theta_A$) and high-frequency band (i.e. $\rho_B$, $\theta_B$) is then supplied to a logic circuit (22), with respect to the prior art may be performed by a programmed microprocessor of conventional design, for analysizing said information to detect the presence of an MFR signal and to identify this signal. This identification appears at the output OUT.

The detection operations are based on the fact that for each pure frequency the amplitude $\rho$ and the phase variation are constant or, in practice, vary within predetermined limits.

Therefore, if an analytical signal $S(t) = x(t) + jy(t)$ has a pure frequency $f_o$, an initial phase $\phi$, and an amplitude $\rho$, then:

$$x(t) = \rho \cos(2\lambda f_o t + \phi) \quad (3)$$

$$y(t) = \rho \sin(2\pi f_o t + \phi) \quad (4)$$

$$S(t) = \rho \exp j\theta(t)$$
with $\theta(t) = 2\pi f_o t + \phi$

The amplitude $\rho$ is constant and the phase $\theta(t)$ is linear. Hence, the phase variation between two instants t and t+$\tau$ is:

$$\Delta\theta(\tau) = 2\pi f_o \tau \quad (5)$$

Thus, if $\tau$ is constant, $\Delta\theta(\tau)$ is constant.

The logic circuit 22 is fed every 2 milliseconds with amplitude information $\rho$ and instantaneous phase information $\theta$. Given the above conditions $\rho$ remains essentially constant and the variations of $\theta$ remain also essentially constant between two successive sampling instants. Further, knowing $\tau$, the measure of $\Delta\theta(\tau)$ enables computing $f_o$. The system is thus able to detect the reception of a pure frequency signal (i.e. a pure sinewave tone), and to identify this frequency.

In practice, noise disturbs these measurements. It will thus be assumed that a tone is detected when the variations of $\rho$ and $\Delta\theta$ measured over a time interval covering a given number of sampling periods remain within predetermined limits.

The system illustrated in FIG. 1 thus represents an MFR receiver composed of two tone receivers, each one capable of receiving four pure tones, and of analyzing means to identify the received tones and derive therefrom the identification of the multifrequency signal received by the MFR receiver.

Figure 2:
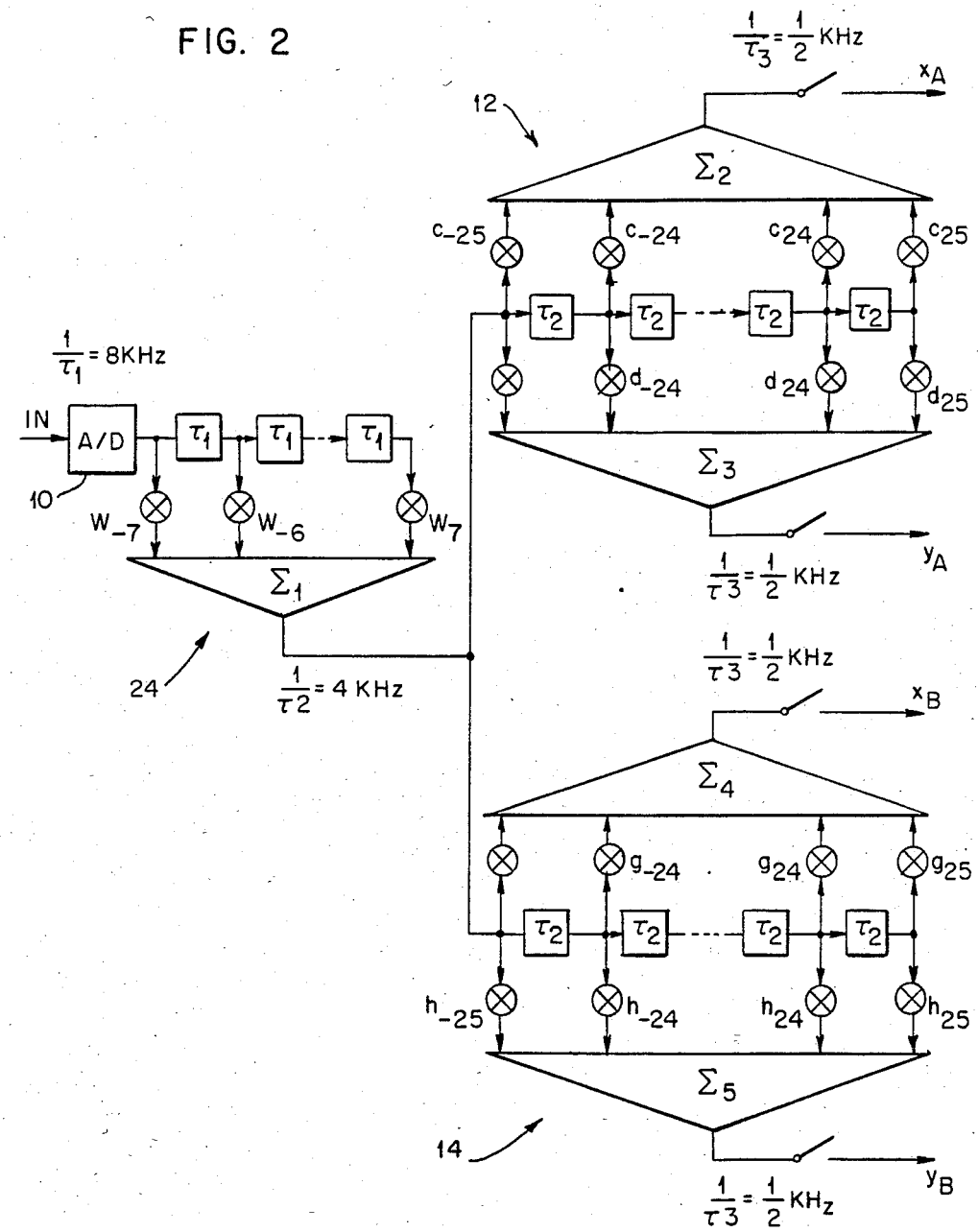
FIG. 2 illustrates an embodiment of circuits belonging to the diagram of FIG. 1.

FIG. 2 illustrates an embodiment of the filter arrangement separating the high- and low-frequency bands. In other words, it shows the elements of FIG. 1 located at the left of devices 18 and 20, plus a low-pass filter (LP) 24 having a frequency bandwidth ranging from 0 to 2 KHz.

The signal samples provided by converter 10 at a rate of 8000 samples per second ($\tau 1 = 1/8000 = 125 \mu s$) are fed into low-pass filter 24. This filter is a transversal digital filter with 15 twelve bit coded coefficients designated by $w_{-7}, w_{-6}, \ldots, w_0, w_1, \ldots, w_7$. These coefficients have been chosen, such as $w_{-n} = w_n$, with:

$w_0 = 1045$
$w_1 = 644$
$w_2 = -4$
$w_3 = -206$
$w_4 = 6$
$w_5 = 140$
$w_6 = -46$
$w_7 = -63$

The above numerical values are defined with $2^{11}$ (decimal 2048) being taken as a neutral multiplication element.

The filter 24 output signal is resampled at the frequency $1/\tau 2 = 4$ KHz before being fed into the Hilbert transformer type filters 12 and 14. Filters 12 and 14 are bandpass filters respectively supplying the in-phase and quadrature components of the signals of the so-called low-frequency groups (627; 770; 852 and 941 Hz) and high-frequency groups (1209; 1336; 1477 and 1633). Each of the filters is made of two transversal digital filters, sharing the same delay line. The coefficients of filters 12 and 14, coded, as previously, with 12 bits, have the values indicated in tables I and II respectively.

TABLE I

| In-Phase Filter $c_{-n} = c_n, n = 0, \ldots, 25$ | In-Quadrature Filter $d_{-n} = -d_n, n = 0, \ldots, 25$ |
|---|---|
| $c_0 = 473$ | $d_0 = 0$ |
| $c_1 = 118$ | $d_1 = 447$ |
| $c_2 = -375$ | $d_2 = 211$ |
| $c_3 = -262$ | $d_3 = -273$ |

TABLE I-continued

| In-Phase Filter $c_{-n} = c_n$, n = 0, ..., 25 | In-Quadrature Filter $d_{-n} = -d_n$, n = 0, ..., 25 |
|---|---|
| $c_4 = 163$ | $d_4 = -266$ |
| $c_5 = 229$ | $d_5 = 69$ |
| $c_6 = -6$ | $d_6 = 165$ |
| $c_7 = -93$ | $d_7 = 20$ |
| $c_8 = -14$ | $d_8 = -31$ |
| $c_9 = -11$ | $d_9 = 11$ |
| $c_{10} = -41$ | $d_{10} = -27$ |
| $c_{11} = 22$ | $d_{11} = -63$ |
| $c_{12} = 72$ | $d_{12} = 6$ |
| $c_{13} = 13$ | $d_{13} = 67$ |
| $c_{14} = -52$ | $d_{14} = 23$ |
| $c_{15} = -23$ | $d_{15} = -32$ |
| $c_{16} = 13$ | $d_{16} = -14$ |
| $c_{17} = 4$ | $d_{17} = 1$ |
| $c_{18} = 1$ | $d_{18} = -5$ |
| $c_{19} = 13$ | $d_{19} = -4$ |
| $c_{20} = 9$ | $d_{20} = 19$ |
| $c_{21} = -19$ | $d_{21} = 10$ |
| $c_{22} = -9$ | $d_{22} = -12$ |
| $c_{23} = 4$ | $d_{23} = -10$ |
| $c_{24} = 11$ | $d_{24} = 2$ |
| $c_{25} = -3$ | $d_{25} = 6$ |

TABLE II

| In-Phase Filter $g_{-n} = g_n$, n = 0, ..., 25 | In-Quadrature Filter $h_{-n} = -h_n$, n = 0, ..., 25 |
|---|---|
| $g_0 = 724$ | $h_0 = 0$ |
| $g_1 = -429$ | $h_1 = 535$ |
| $g_2 = -126$ | $h_2 = -566$ |
| $g_3 = 381$ | $h_3 = 188$ |
| $g_4 = -228$ | $h_4 = 106$ |
| $g_5 = 22$ | $h_5 = -86$ |
| $g_6 = -25$ | $h_6 = -29$ |
| $g_7 = 115$ | $h_7 = 1$ |
| $g_8 = -89$ | $h_8 = 107$ |
| $g_9 = -21$ | $h_9 = -117$ |
| $g_{10} = 61$ | $h_{10} = 36$ |
| $g_{11} = -14$ | $h_{11} = 2$ |
| $g_{12} = -7$ | $h_{12} = 33$ |
| $g_{13} = -34$ | $h_{13} = -50$ |
| $g_{14} = 62$ | $h_{14} = 9$ |
| $g_{15} = -35$ | $h_{15} = 29$ |
| $g_{16} = 2$ | $h_{16} = -19$ |
| $g_{17} = -6$ | $h_{17} = -3$ |
| $g_{18} = 23$ | $h_{18} = -4$ |
| $g_{19} = -16$ | $h_{19} = 23$ |
| $g_{20} = -4$ | $h_{20} = -22$ |
| $g_{21} = 9$ | $h_{21} = 5$ |
| $g_{22} = 1$ | $h_{22} = 1$ |
| $g_{23} = -6$ | $h_{23} = 5$ |
| $g_{24} = 0$ | $h_{24} = -10$ |
| $g_{25} = 4$ | $h_{25} = 4$ |

Conversions of signals from Cartesian coordinates (x, y) into polar coordinates ($\rho_o$, $\theta_o$) are performed in devices 18 and 20, based on the following expressions:

$$\begin{cases} x = \rho_o \cos \theta_o & (6) \\ y = \rho_o \sin \theta_o & (7) \end{cases}$$

The purpose of the polar coordinates convertors 18, 20 is to determine $\rho_o$ and $\theta_o$. The conversion is performed by having the components (x, y) of each sample submitted to the dichotomy operations illustrated in FIG. 3.

Figure 3:
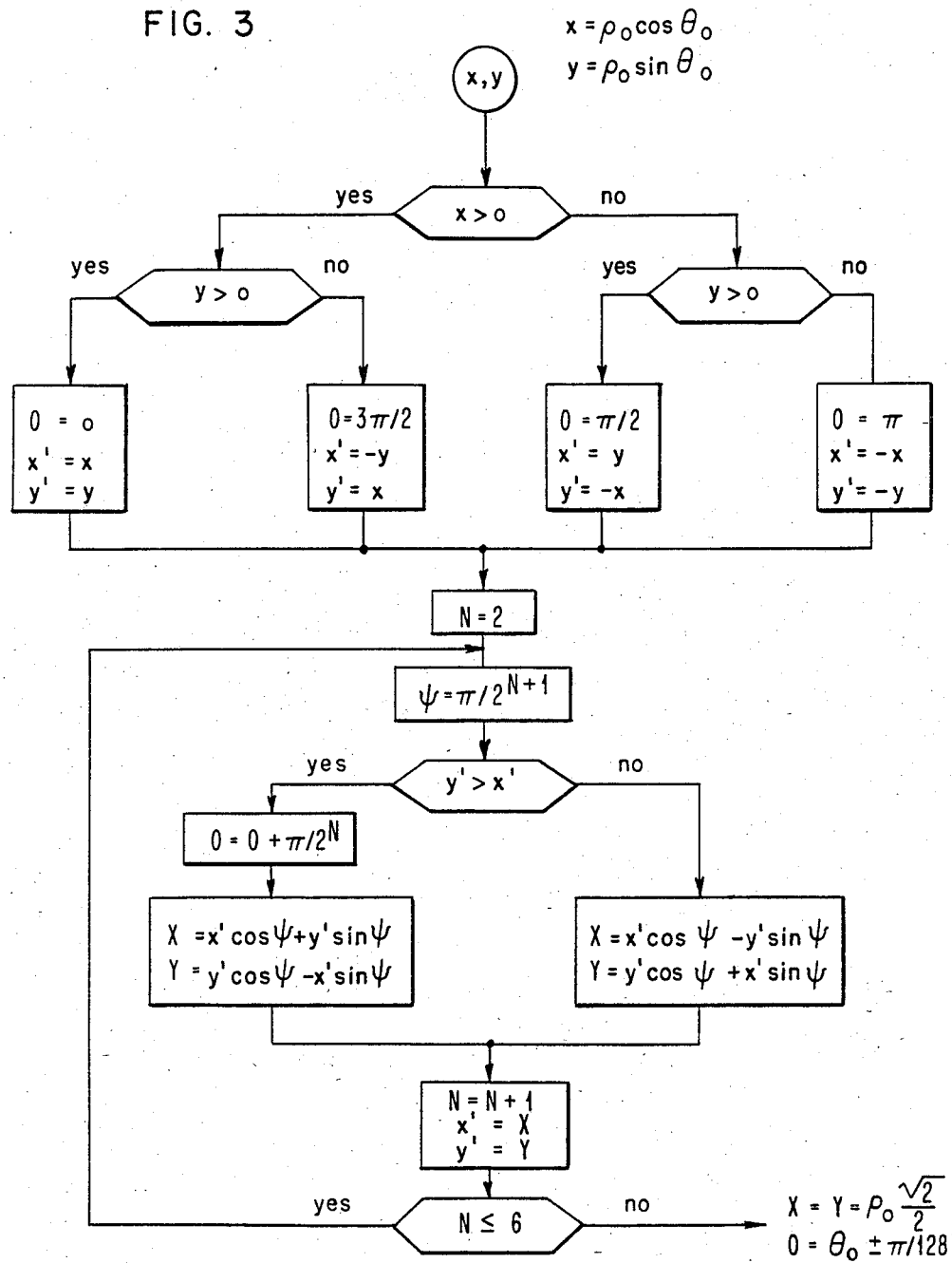
FIG. 3 shows the flowchart illustrating the operation of circuits 18 and 20 of FIG. 1.
Figure 3A:
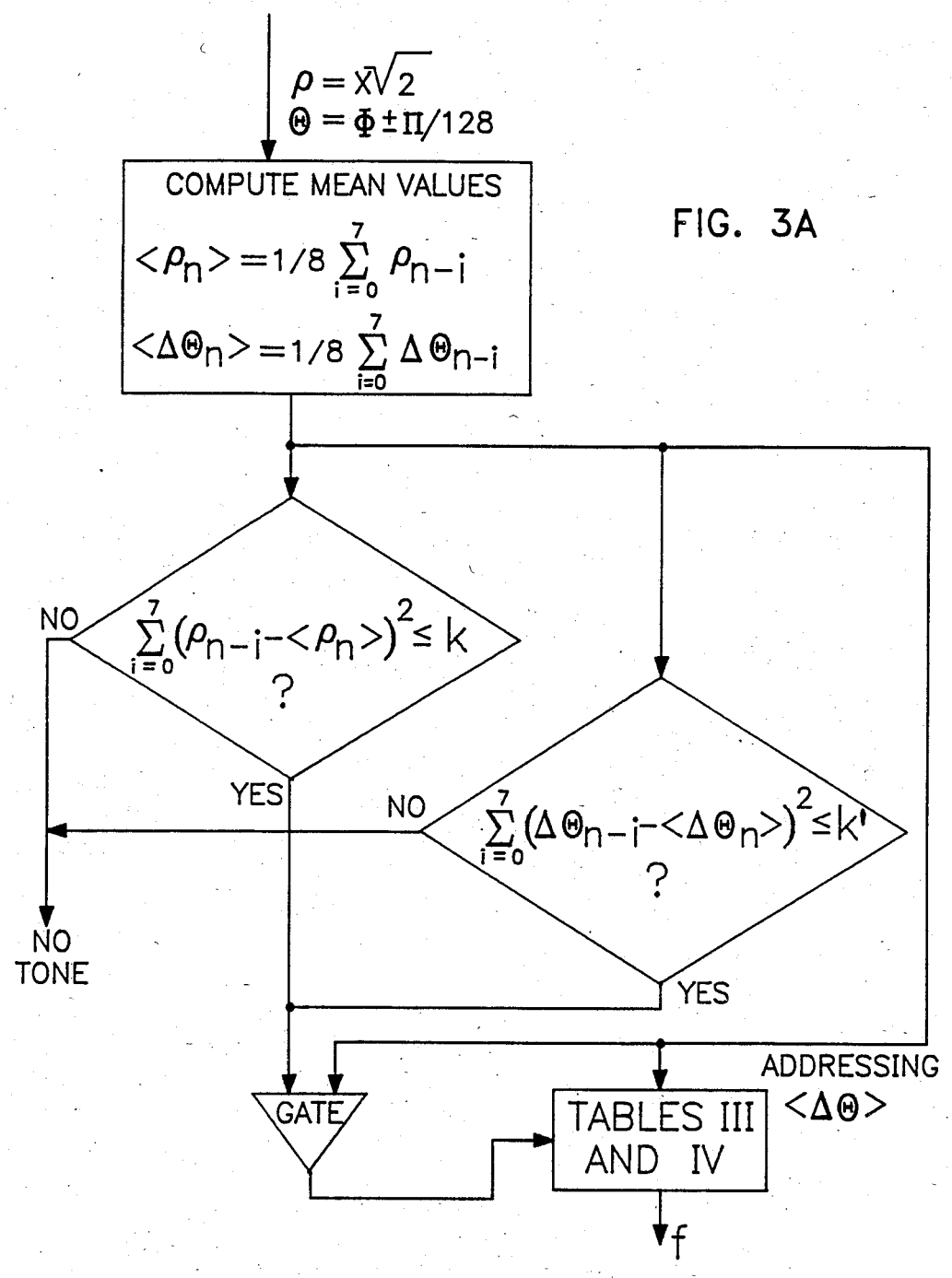
FIG. 3A is a flow chart illustrating the operations performed in circuit 22.

The purpose of the operations indicated in the upper part of FIG. 3 is to rotate (first rotation of the received and filtered signal) the (x, y) vector from its initial position and bring it into the first quadrant of the trigonometric circle, while measuring the magnitude of the effected rotation. The first rotated vector is then subjected to successive rotations (second rotation) by $\pi/8$, $\pi/16$, $\pi/32$, $\pi/64$, $\pi/128$, tracking thereby the $\pi/4$ trigonometric position through successive damped approximations. These operations are shown in the lower part of FIG. 3. When they are terminated, values x', y' and $\phi$ are available. x' and y' are the coordinates of the vector in its final position, i.e. made as close to $\pi/4$ as possible. Hence x' $\approx$ y'. As to value $\phi$, it is related to the successive rotations made on the original vector (x, y). It indicates the value of the phase of said vector (x, y) in its initial position with a precision of $\pi/128$.

The polar converters 18 and 20 would thus compute the polar coordinates components using the information derived from the first and second rotation informations, using computing means (not shown) performing the following operation:

$$\rho_o = x\sqrt{2} \text{ and } \theta_o = \phi \pm \pi/128 \qquad (8)$$

with X=x'

It should be noted that $\rho_o$ and $\theta_o$ could be measured more precisely by proceeding further with the second rotations, i.e. increasing the upper limit of number N (see FIG. 3). But, in any case, by performing the above computing operations (dichotomic operations), the polar coordinates converter 18 and 20 provide amplitude ($\rho_A$, $\rho_B$) and phase ($\theta_A$, $\theta_B$) informations.

As mentioned above, a multifrequency (MF) signal can be considered as received when a pure tone frequency is detected in each one of filters 12 and 14, each of these pure frequencies having a given value. It has also been noted that the presence of a pure frequency was indicated by an amplitude and a phase variation that are constant or vary within predetermined limits over a sufficiently long time interval (several times 2 ms). We will now indicate how the operations of tone detection and identification of the received multifrequency signal are performed by the logic circuit 22.

Let us assume that $\rho_n$ and $\theta_n$ respectively represent the received signal amplitude and instantaneous phase at the time the $n^{th}$ sample of the received signal is to be processed by the logic circuit 22.

The relationship between the instantaneous phase of a signal and its frequency has been considered above. In practice, tone frequencies have a precision of $\pm 1.8\%$ and this applies also to the phases. Also, from above considerations one should realize that phase variation indications will have to be considered rather than phase indications.

For the so-called low-frequency group (group A), the valid limits of instantaneous phase variations should be as indicated in Table III.

TABLE III

| | |
|---|---|
| 684,5 < f < 709,5 | 132°,8 < $\Delta\theta$ < 150°,8 |
| 756,1 < f < 783,9 | 184°,4 < $\Delta\theta$ < 204°,4 |
| 836,7 < f < 865,3 | 242°,4 < $\Delta\theta$ < 264°,4 |
| 924 < f < 957,9 | 305°,2 < $\Delta\theta$ < 329°,6 |

For the so-called high-frequency group (group B), the instantaneous phase variations are indicated in Table IV.

TABLE IV

| | |
|---|---|
| 1187,2 < f < 1230,8 | 134°,8 < $\Delta\theta$ < 166°,1 |
| 1312 < f < 1360 | 224°,6 < $\Delta\theta$ < 259°,2 |
| 1450,4 < f < 1503,6 | −35°,7 < $\Delta\theta$ < 2°,6 |
| 1603,6 < f < 1662,4 | 74°,6 < $\Delta\theta$ < 116°,9 |

The Tables III and IV are both stored into a memory (not shown) within the logic device 22. Said memory thus stores frequency versus phase variation informations.

In practice, when a multifrequency signal belonging to the signal to be detected is received, by the device 22 it contains two signals, $S_A$ and $S_B$ including noise added to the pure tones of frequency $f_A$ and $f_B$. A polar coordinate expression of the $S_A$ and $S_B$ signals would read:

$$S_A(nT) = \rho_A \exp j(2\pi f_A nT + \psi_A) + \text{noise},$$

$$S_B(nT) = \rho_B \exp j(2\pi f_B nT + \psi_B) + \text{noise},$$

where T=2 ms, $\psi_A$ and $\psi_B$ are initial phase values and n designates the sampling instants (i.e. n=1, 2, 3, ...).

Differential measurements over $S_A$ and $S_B$ would obviously tend to neutralize the noise effects.

One may also consider that:

$$q_A = S_A(nT) S_A^x[(n-m)T] = \rho_A^2 \exp j\Delta\theta_A + \text{noise terms} \quad (9)$$

and $$q_B = S_B(nT) S_B^x[(n-p)T] = \rho_B^2 \exp j\Delta\theta_B + \text{noise terms} \quad (10)$$

with:

$$\Delta\theta_A = 2\pi f_A mt \quad (11)$$

$$\Delta\theta_B = 2\pi f_B pt \quad (12)$$

wherein:
  m=$\tau_A$/T and p=$\tau_B$/T with $\tau_A$ and $\tau_B$ respectively representing the time intervals between two consecutive measurements made on the received and filtered signals $S_A$ and $S_B$. In practice, with a sampling rate of 500 Hz, m and p could both be chosen equal to 1.
  the symbol * designating complex conjugates.

The above expressions (11) and (12) show that assuming the phase variations of the received signals over equally spaced time intervals remain constant then chances are that the received signals are pure sinewaves. A confirmation of this assumption would be given by checking that the signal amplitude $\rho_A$ or $\rho_B$ remains constant.

In practice due to limited measurements precision one would rather check that phase variations $\Delta\theta$ and amplitudes $\rho$ remain substancially constant. This is why, the logic device 22 includes circuits (not shown) for computing mean values of phase variations $\Delta\theta_n$ and amplitude $\rho_n$ for each of the two received signals, i.e.: $S_A$ and $S_B$.

These mean values are computed over 8 samples, thus:

$$<\rho_n> = \frac{1}{8} \sum_{i=0}^{7} \rho_{n-i} \quad (13)$$

$$<\Delta\theta_n> = \frac{1}{8} \sum_{i=0}^{7} \Delta\theta_{n-i} \quad (14)$$

Logic circuit 22 also determines the amplitude and phase variations by executing the following operations:

$$\sum_{i=0}^{7} (\rho_{n-i} - <\rho_n>)^2 \quad (15)$$

and $$\sum_{i=0}^{7} (\Delta\theta_{n-i} - <\Delta\theta_n>)^2 \quad (16)$$

The numerical values provided by device 22 and expressed in equations (15) and (16) are then compared, into amplitude and phase checking means (not shown), with predetermined threshold values K and K', which values represent the limits within which $\rho$ and $\Delta\theta$ would be considered substantially constant.

When $\rho_n$ and $\Delta\theta_n$ are substantially constant, i.e.

$$\sum_{i=0}^{7} (\rho_{n-i} - <\rho_n>)^2 \leq K$$

and $$\sum_{i=0}^{7} (\Delta\theta_{n-i} - <\Delta\theta_n>)^2 \leq K'$$

then the received sinewave signals are to be identifyied. For that purpose, the logic circuit 22 comprises a decision means (not shown) for comparing $<\Delta\theta n>$, with the stored phase variation values $\Delta\theta$ indicated in Table III or IV, in order to detect the reception of a multifrequency signal and for identifying said multifrequency signal.

While the invention has been particularly shown and described with reference to a preferred embodiment thereof, it will be understood by those skilled in the art that numerous changes in form and detail may be made without departing from the spirit and scope of the invention.

What is claimed:

1. A method for detecting the reception of at least one pure tone frequency in a predetermined set of frequencies within a given frequency bandwidth, and for identifying said received tone frequency, said method including the steps of:
   sampling and converting the received signal to a digital form;
   bandpass filtering the converted digital signal within said predetermined bandwidth, and providing in-phase and quadrature components x,y of the filtered signal;
   converting said x,y components into polar (phase, amplitude) components;
   comparing successive values of the amplitude components over a given number of sampling periods for deriving an amplitude variation information therefrom;
   computing successive phase variation values over equally spaced time intervals to derive a phase variation information therefrom;
   detecting the reception of a pure tone by detecting that said amplitude and phase variations remain within predetermined respective limits; and,
   identifying said detected pure tone by comparing said computed phase variation value with a set of predetermined frequency versus phase variation values for said predetermined set of frequency(ies).

2. A process according to claim 1 wherein said detecting step is performed over mean values of phase and amplitude variations computed over a predetermined number of consecutive phase and amplitude components.

3. A process according to claim 1 or 2 wherein said bandpass filtering providing x,y components is based on using Hilbert transformer techniques.

4. A process according to claim 3 wherein said conversion from x,y components to polar components is achieved by operating:

a first rotating operation of the x,y vector from its original position to the first quadrant of the trigonometric circle, and by recording the magnitude of said first rotation;

a second rotating operation for tracking the first rotated vector with respect to pi/4 through successive damped approximations, and for deriving therefrom information relative to new components (x',y'); and, computing operations responsive to the information derived by said first and second rotations for computing the polar coordinates of said filtered signal.

* * * * *